UNITED STATES PATENT OFFICE.

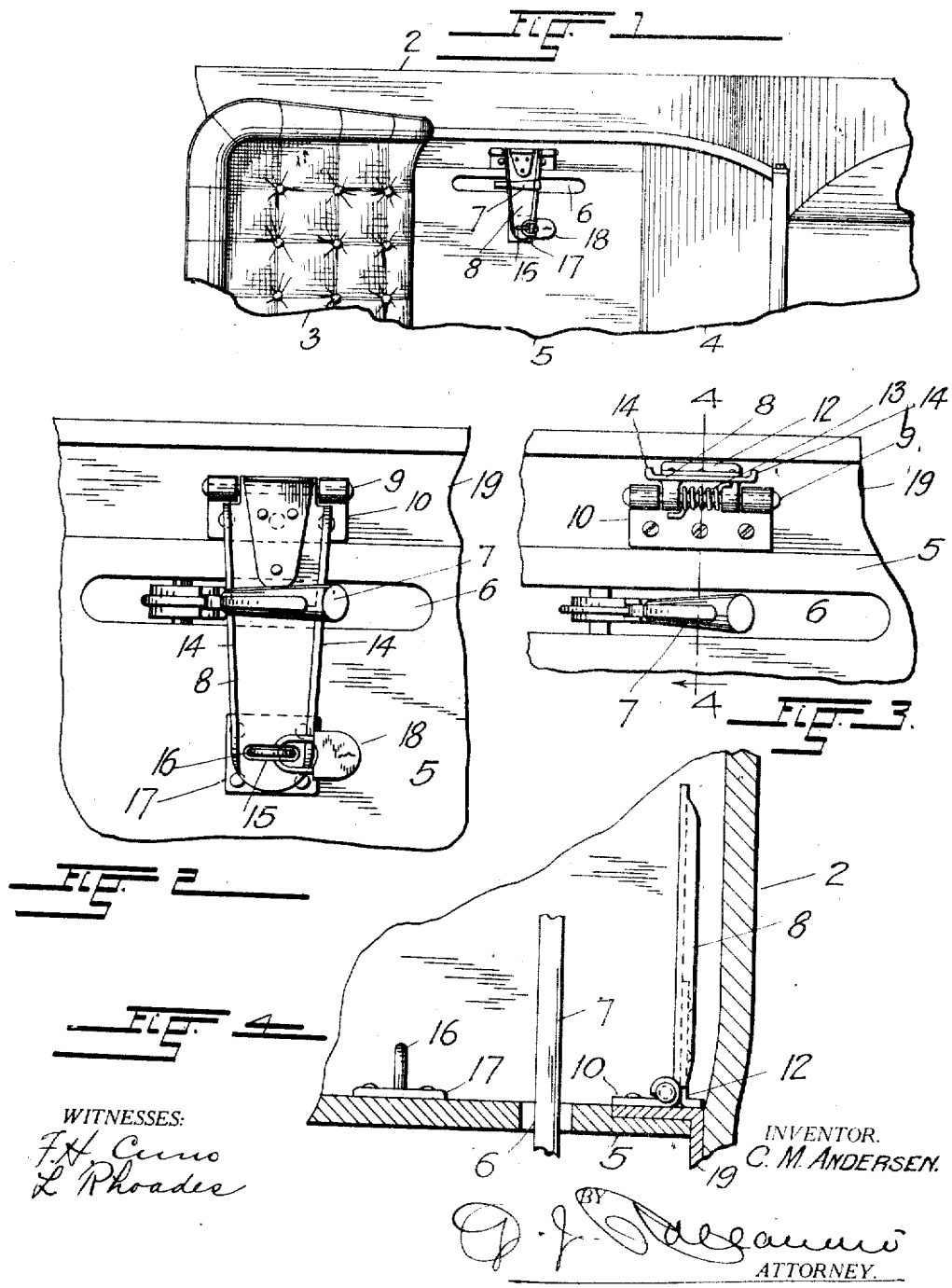

CHARLES M. ANDERSEN, OF DENVER, COLORADO, ASSIGNOR TO AUTO POWER GENERATOR & APPLIANCE CO., A CORPORATION OF COLORADO.

LOCK FOR MOTOR-VEHICLES.

1,204,533.  Specification of Letters Patent.  Patented Nov. 14, 1916.

Application filed October 13, 1915. Serial No. 55,642.

*To all whom it may concern:*

Be it known that I, CHARLES M. ANDERSEN, a citizen of the United States, residing at Denver, in the county of Denver and State of Colorado, have invented certain new and useful Improvements in Locks for Motor-Vehicles, of which the following is a specification.

My invention relates to devices for locking motor vehicles to prevent their operation by unauthorized persons, and its primary object resides in providing a key controlled mechanism of very simple construction by means of which the controlling lever of the brake or other part of the operating mechanism of a motor vehicle, may be locked against active movement.

With the above object in view, my invention consists of a hasp, having means for its pivotal attachment to a fixed part of a motor vehicle, a spring which yieldingly holds the hasp in its normal inoperative position, a staple coöperative with the hasp and mounted on a plate for its connection with the vehicle, and a padlock which is applied to the staple to secure the hasp in its operative position. The hasp and the staple are placed at opposite sides of the slot in the floor of the vehicle in which the lever which controls the brake or other operating part of the vehicle mechanism has a reciprocating movement. The hasp is normally held in an upright position by its spring and when placed over the staple and secured by the padlock, its position across the slot in the floor of the vehicle, obstructs the movement of the lever and thereby prevents the operation of the brake or other mechanism with which the lever is connected. It will thus be seen that when after adjustment of the lever to a position in which the propelling mechanism of the vehicle is inoperative, the hasp is placed in its operative position across the slot and secured by the padlock, it is impossible to put the vehicle in motion except by the use of a key fitting the padlock.

An embodiment of my invention is shown in the accompanying drawings in the various views of which like parts are similarly designated, and in which, Figure 1 is a fragmentary plan view of a motor vehicle showing my improved lock in its operative position with relation to an operating lever of the same, Fig. 2, an enlarged plan view of the lock in its operative position, Fig. 3, a similar view of the lock in its normal inoperative position, and Fig. 4, a vertical section along the line 4—4 of Fig. 3.

Referring more specifically to the drawings, the reference character 2 designates the body of a motor-vehicle including the front seat 3 and the dash 4. The floor 5 of the car, between the seat and the dash, has a slot 6 in which a lever 7 which controls the brake or the propelling mechanism of the vehicle, has a reciprocating movement.

My improved lock comprises a hasp 8 which by means of a pivot pin 9 is at one of its ends articulately attached to a holding plate 10. The plate has a plurality of holes for the reception of screws or bolts by which it is secured upon the floor of the car, and the hasp has a rearwardly projecting foot 12 by which it is supported in an upright position, as shown in Fig. 4. A spring 13 coiled around the pivot pin, engages at its extremities the holding plate 10 and the face of the hasp 8 for the purpose of yieldingly maintaining the latter in its inoperative position in which it is supported upon its foot 12. The hasp is reinforced by longitudinal flanges 14 and it has at its free end a transverse slot 15 to admit the staple 16. The staple is mounted upon a plate 17 provided with apertures for the passage of screws or bolts by means of which it is secured upon the floor of the car in a position relative to the holding plate 10 to permit the staple to pass through the slot of the hasp when the latter is moved to a horizontal position against the action of its spring. The hasp is secured in its operative position with relation to the staple by means of a padlock 18 whose bow passes through the staple above the hasp as shown in Fig. 2. By securing the holding plate of the hasp and the plate 17 of the staple at opposite sides of the slot 6 in which the lever has its movement, the hasp when secured upon the staple will extend in the path of the lever and thereby obstruct and prevent its operative motion.

While the hasp may be secured to any convenient part of the vehicle, I preferably fasten it to one of the metallic wide bars 19 of the chassis, as shown in the drawings, and I desire it understood that while I have shown and described my lock in the best and simplest form at present known to me, variations in the construction and arrangement of its parts required to adapt it for use on vehicles of different constructions, may be resorted to within the spirit of my invention as defined in the following claims.

I claim:

1. The combination with a motor-vehicle, of a pivoted hasp, a foot on said hasp for supporting it in its normal upright position, a spring yieldingly maintaining the hasp in its said normal position, a staple fixed for coöperation with the hasp, and a lock to secure the hasp upon the staple.

2. A locking device for motor-vehicles comprising a plate adapted to be secured upon the floor of a vehicle, a hasp pivoted on said plate, a foot on said hasp for supporting it in its normal position at right angles to the plate, a spring yieldingly maintaining the hasp in its said normal position, a staple coöperative with the hasp and adapted to be fixed upon the floor of a vehicle, and a lock for securing the hasp upon the staple.

3. A locking device for motor-vehicles comprising a plate, a hasp pivoted thereon, a foot on the hasp for supporting it in its normal position on the plate, a spring yieldingly maintaining the hasp in its said normal position, a staple coöperative with the hasp, and a lock for securing the hasp upon the staple.

In testimony whereof I have affixed my signature in presence of two witnesses.

CHARLES M. ANDERSEN.

Witnesses:
G. J. ROLLANDET,
L. RHOADES.